United States Patent
Tomala et al.

(10) Patent No.: US 9,591,503 B2
(45) Date of Patent: Mar. 7, 2017

(54) MEASUREMENTS LOGGING AND TRANSMISSION AT A USER EQUIPMENT OF A MOBILE COMMUNICATIONS SYSTEM

(75) Inventors: Malgorzata Tomala, Nowe Miasto nad Pilica (PL); Gyula Bodog, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 100 days.

(21) Appl. No.: 13/702,597

(22) PCT Filed: Jun. 16, 2010

(86) PCT No.: PCT/EP2010/058463
§ 371 (c)(1),
(2), (4) Date: Jan. 15, 2013

(87) PCT Pub. No.: WO2011/157292
PCT Pub. Date: Dec. 22, 2011

(65) Prior Publication Data
US 2013/0109320 A1    May 2, 2013

(51) Int. Cl.
*H04W 24/10* (2009.01)
*H04W 88/06* (2009.01)
*H04W 48/18* (2009.01)

(52) U.S. Cl.
CPC ............ *H04W 24/10* (2013.01); *H04W 48/18* (2013.01)

(58) Field of Classification Search
CPC ........ H04W 4/08; H04W 24/10; H04W 88/06
See application file for complete search history.

(56) References Cited

U.S. PATENT DOCUMENTS

| 8,838,091 | B2* | 9/2014 | Jung | H04W 24/10 455/423 |
| 2006/0166693 | A1* | 7/2006 | Jeong | H04W 48/16 455/525 |
| 2007/0041330 | A1* | 2/2007 | Bostica et al. | 370/252 |
| 2010/0190488 | A1* | 7/2010 | Jung et al. | 455/424 |
| 2011/0183661 | A1* | 7/2011 | Yi et al. | 455/422.1 |
| 2011/0201279 | A1* | 8/2011 | Suzuki et al. | 455/67.11 |
| 2011/0250910 | A1* | 10/2011 | Lee et al. | 455/466 |
| 2012/0028611 | A1* | 2/2012 | Wu | 455/411 |
| 2012/0092998 | A1* | 4/2012 | Chang et al. | 370/241 |
| 2012/0108199 | A1* | 5/2012 | Wang et al. | 455/405 |
| 2013/0072182 | A1* | 3/2013 | Jung et al. | 455/422.1 |

OTHER PUBLICATIONS

R2-102056, 3GPP TSG-RAN WG2 Meeting #69bis, Beijing China, Apr. 12-16, 2010, Alcatel-Lucent, "Idle Mode Logged MDT Reporting Mechanism" 4 pgs.

(Continued)

*Primary Examiner* — Cindy Trandai
(74) *Attorney, Agent, or Firm* — Harrington & Smith (57) ABSTRACT

A user equipment performs measurements logging which has been defined for a scheduled area belonging to a network of a mobile communications network, the measurements including information about performance of the scheduled area. In case the user equipment connects to an area of areas of the mobile communications network which belongs to a network different from the network of the scheduled area, the user equipment prevents transmission of the logged measurements.

18 Claims, 3 Drawing Sheets

(56) References Cited

OTHER PUBLICATIONS

R2-102912, 3GPP TSG-RAN WG2 #70, Montreal, Canada, May 10-14, 2010, Huawei, "Principles for Logged MDT in IDLE", 3 pgs.
R2-102997, 3GPP TSG-RAN WG2 #70, May 10-14, 2010, Montreal, Canada, NTT DOCOMO, Inc., "MDT Support for Roaming and Network Sharing Scenarios", 4 pgs.
R3-101565, 3GPP TSG-RAN WG3 #68, May 10-14, 2010, Montreal, Canada, NTT DOCOMO, Inc., "MDT Support for Roaming and Network Sharing Scenarios", 2 pgs.
3GPP TS 37.320 V0.4.1 (May 2010), "$3^{rd}$ Generation Partnership Project; Technical Specification Group TSG RAN Universal Terrestrial Radio Access (E-UTRA); Radio Measurement Collection for Minimization of Drive Tests (MDT); Overall description; Stage 2 (Release 10)", 12 pgs.

* cited by examiner

MEASUREMENTS LOGGING AND TRANSMISSION AT A USER EQUIPMENT OF A MOBILE COMMUNICATIONS SYSTEM

The present invention relates to measurements logging and transmission at a user equipment (UE) of a mobile communications system. For example, the present invention is applicable for 3G (third generation) and LTE (long term evolution) UEs.

An MDT (minimization of drive tests) function aims at defining an automatic collection of UE measurements, to enable easier monitoring of network performance and consequently to replace expensive drive tests performed by operators manually.

The MDT function considers re-usage of measurements defined for typical mobility control and corresponding real-time reporting mode, and has brought logging measurements and non-real time reporting mechanisms into the standard. A UE is configured by a mobile communications network by dedicated signalling before the UE enters an idle state, and the UE follows the configuration parameters until the next connection to the network. After entering a connected mode the UE proceeds normally with its call. Meanwhile, the network may decide to retrieve an MDT report including logged measurements from the UE.

The UE respects the configuration for its logging session in idle, unless an ending condition (i.e. duration timer) becomes valid. In addition, the validity of configuration may depend on a service area. For example, if no area scope for MDT measurements is configured, the MDT configuration is valid in the entire RPLMN (registered public land mobile network) of a UE.

Since the RPLMN can be either an HPLMN (home PLMN) or a VPLMN (visited PLMN), some MDT support for roaming and inter-PLMN scenarios is required. However, in a network sharing scenario where MDT data collection is allowed, it is important to prevent sharing of not desired information relevant for a particular PLMN.

Regardless of configuration validity, radio measurements logged by the UE, such as time-stamped network measurements, are recognized as an always valuable input for network optimization, and are treated as not outdated data. It is required that the UE keeps the MDT reports for network retrieval. Thus, although the configuration becomes invalid and may be erased when the UE changes the PLMN, the logged data is held in the UE. In other words, if logged data has survived in the UE to the point of network requests, it should be transferred.

Assuming that the UE is moving while logging radio measurements, it is a likely scenario that the UE will end up in a different PLMN than where it has been configured. Thus, the recorded data may be retrieved by any node supporting MDT, even if it does not belong to the PLMN where configuration took place.

Since MDT reports carry radio measurements, it is not desired to allow the data to reach other operators' networks.

Moreover, during the connected mode the UE performs real-time reporting, and usually the above-mention problem will not occur. However, an RLF (radio link failure) may occur during the MDT collection. Then the UE may reconnect to the network in another PLMN after the RLF. The MDT report about the RLF can only be reported after the UE reconnects to the network.

Thus, collecting radio measurements in the UE runs the risk of forwarding data relevant for a monitored area belonging to a network to the subsequent area belonging to a different network. Thus, the UE may be used for spying visited network topology.

The present invention aims at preventing network information collected at a UE from being leaked.

This is achieved by an apparatus and method as defined in the appended claims. The invention may also be implemented as a computer program product.

According to an embodiment of the invention, UE measurement logs defined for a scheduled area belonging to a network of a mobile communications network can be prevented from being routed to any other network of the mobile communications network.

In the following embodiments of the present invention will be described with reference to the accompanying drawings, in which.

Figure 1:
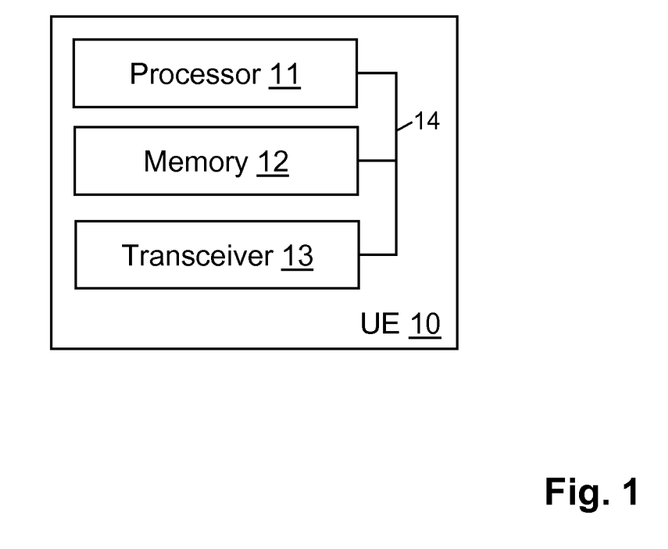
FIG. 1 shows a schematic block diagram illustrating a structure of a user equipment according to an embodiment of the invention.

As a preliminary matter before exploring details of various implementations, reference is made to FIG. 1 which illustrates a simplified block diagram of a structure of a user equipment (UE) 10 that is suitable for use in practicing the exemplary embodiments of this invention.

The UE 10 includes a processor 11, a memory 12 that may store a program, and a suitable radio frequency (RF) transceiver 13 coupled to one or more antennas (not shown) for bidirectional wireless communications over one or more wireless links (not shown) with a mobile communications network. The processor 11, the memory 12 and the transceiver 13 are coupled by a bus 14.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory 12 may store a program which may include program instructions that, when executed by the processor 11, enable the UE 10 to operate in accordance with the exemplary embodiments of this invention, as detailed below. Inherent in the processor 11 is a clock to enable synchronism among the various apparatus for transmissions and receptions within the appropriate time intervals and slots required, as the scheduling grants and the granted resources/subframes are time dependent. The transceiver 13 includes both transmitter and receiver, and inherent in each is a modulator/demodulator commonly known as a modem.

In general, the exemplary embodiments of this invention may be implemented by computer software stored in the memory 12 and executable by the processor 11 of the UE 10, or by hardware, or by a combination of software and/or firmware and hardware, which may include integrated circuit modules. The design of integrated circuits is by and large a highly automated process. Complex and powerful software tools are available for converting a logic level design into a semiconductor circuit design ready to be etched and formed on a semiconductor substrate. Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory 12 may be of any type suitable to the local technical environment and may be implemented using any suitable data storage technology, such as semiconductor-based memory devices, magnetic memory devices and systems, optical memory devices and systems, fixed memory and removable memory. The processor 11 may be of any type suitable to the local technical environment, and may include one or more of general purpose computers, special purpose computers, microprocessors, digital signal processors (DSPs) and processors based on a multi-core processor architecture, as non-limiting examples.

The processor 11 performs measurements logging which has been defined for a scheduled area belonging to a network of a mobile communications network. The measurements logging defined for the scheduled area may comprise measurements logging defined for the network of the scheduled area, e.g. in cases in which no measurement areas are defined. In these cases the scheduled area corresponds to the network.

It is noted that the mobile communications network may comprise a plurality of networks, and the networks each may comprise a plurality of areas. Thus, also the mobile communications network comprises a plurality of areas which may belong to different networks.

The measurements comprise information about performance of the scheduled area, e.g. MDT data. When the processor 11 detects that an area of areas of the mobile communications network to which the transceiver 13 connects the UE 10 is different from the scheduled area, the processor 11 may cease the defined measurements logging for the scheduled area. In particular, the processor 11 prevents transmission of the logged measurements in case the area to which the transceiver 13 connects the UE 10 belongs to a network of the mobile communications network which is different from the network of the scheduled area. In the case of different networks, the processor 11 may delete the logged measurements for the scheduled area, or hold the logged measurements for a predetermined period of time and/or until the transceiver 13 reconnects the UE 10 to the network of the scheduled area, i.e. to the scheduled area itself or to an area of the mobile communications network belonging to the network of the scheduled area, based on a condition. The condition may comprise at least one of a status of the memory 12 of the UE 10 in which the logged measurements may be stored, a status of a battery (not shown) of the UE 10 and a network condition. When the processor 11 detects that the area to which the transceiver 13 connects the UE 10 is the scheduled area or an area belonging to the network of the scheduled area, the processor 11 allows transmission of the logged measurements for the scheduled area.

The areas and networks may each comprise an identity, and the processor 11 may record the logged measurements for the scheduled area with the identity of the scheduled area and the identity of the network of the scheduled area. In case the identity of the network of the area to which the transceiver 13 connects the UE 10 is different from the identity of the network recorded for the logged measurements, the processor 11 prevents transmission of the logged measurements. In this case, the processor 11 may delete the logged measurements or hold the logged measurements as described above.

The areas of the mobile communications network may comprise at least one of the following: cells, lists of cells, tracking areas, routing areas and location areas. The measurements may be collected in idle and/or connected mode of the UE 10.

Figure 2:
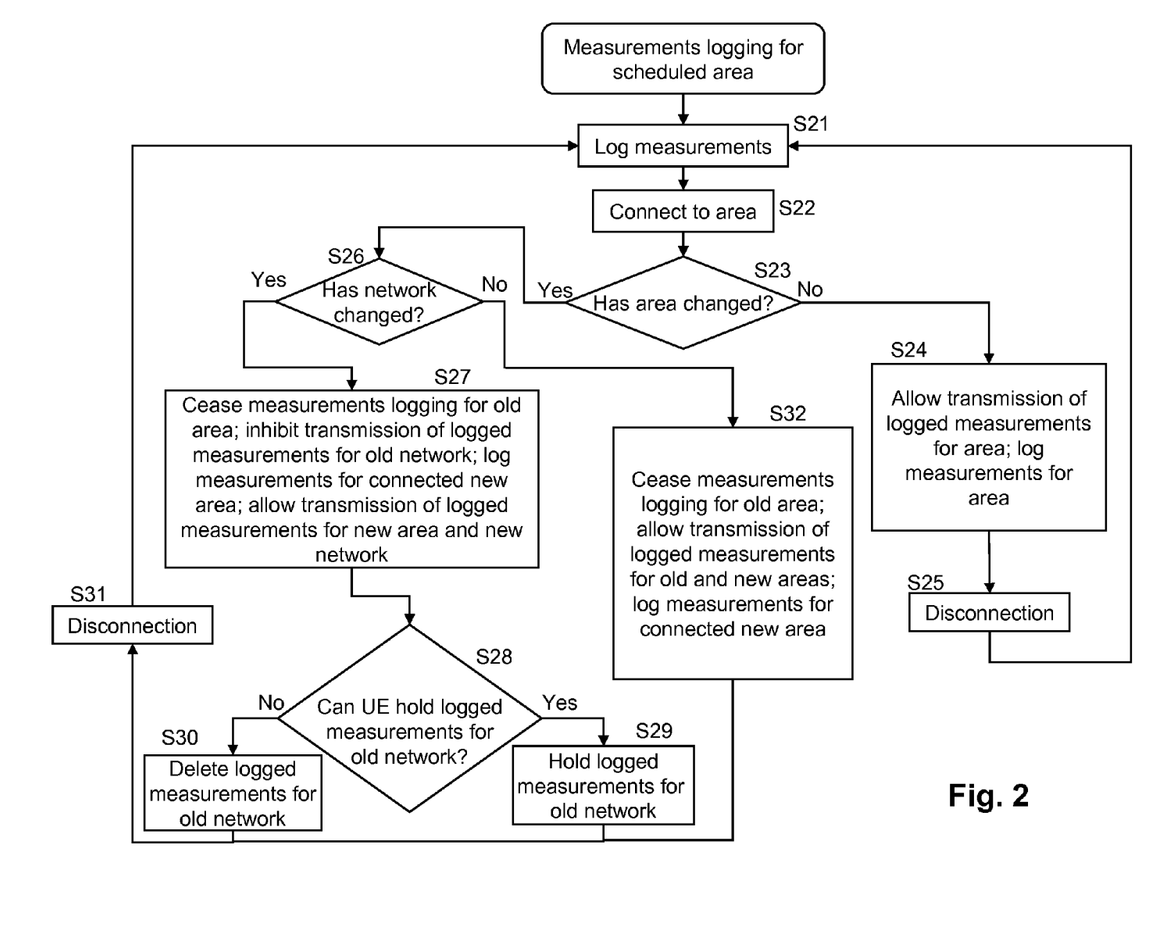
FIG. 2 shows a flow chart illustrating a method of logging measurements by a user equipment according to an embodiment of the invention.

FIG. 2 shows a flow chart illustrating a method of logging measurements for a scheduled area of a mobile communications network according to an embodiment of the invention.

In step S21, the UE 10 performs measurements logging configured for the scheduled area. The scheduled area belongs to a network of the mobile communications network. In case no particular measurements logging is defined for the scheduled area, measurements logging determined for the network of the scheduled area may be used. The UE 10 may be in idle mode in step S21. In step S22, the UE 10 connects to an area of the mobile communications network. Connection may be performed to process a call, for example. In step S23 it is checked by the UE 10 whether the connected area is identical to the scheduled area or whether the area has changed. In case the area has not changed (No in step S23), the UE 10 allows transmission of logged measurements for the area and may continue to log measurements for the area in connected mode in step S24. In step S25, disconnection may take place. The process may return to step S21 of logging measurements for the area.

In case the area has changed (Yes in step S23), in step S26 it is checked whether also the network has changed, i.e. whether the network of the connected new area is different from the network of the previous (old) area. In case the network has changed, the UE 10 ceases measurements logging for the previous (old) area and inhibits transmission of logged measurements for the old area in step S27. Thus, when a measurement report request is received by the UE 10 from the new area belonging to the new network, no logged measurements for the old network are transmitted. In case measurements logging is configured for the connected new area, the UE 10 logs measurements for the new area, and allows transmission of logged measurements for the new area in the connected mode. Moreover, in case the UE 10 holds logged measurements for the new network which were collected in the past when the UE 10 was configured to log measurements for an area belonging to the new network, such logged measurements are allowed to be transmitted in the connected mode.

In step S28, the UE 10 may perform a decision as to whether it can hold logged measurements for the old network. For example, such decision may be based on a status of the memory 12 of the UE 10 in which the logged measurements may be stored, a status of a battery of the UE 10 and a network condition. In case it is decided that the logged measurements for the old network can be stored, in step S29 the UE 10 holds these logged measurements e.g. in the memory 12. In case it is decided that the logged measurements for the old network cannot be stored, in step S30 the UE 10 deletes the logged measurements for the old network. In step S31, disconnection may take place. The process may return to step S21 of logging measurements for the new area.

In case the network has not changed in step S26, the UE 10 may cease measurements logging for the old area. The UE 10 allows transmission of logged measurements for the old area since the new area belongs to the same network as the old area in step S32. In case measurements logging is configured for the connected new area, the UE 10 logs measurements for the new area, and allows transmission of logged measurements for the new area in the connected mode in step S32. In step S31, disconnection may take place. The process may return to step S21 of logging measurements for the new area.

It is to be noted that in case no measurement areas are configured, step S23 may be replaced by step S26 in FIG. 2. Then, if the network has not changed, the flow chart branches to step S24 in which transmission of logged measurements for the network are allowed and measurements may be logged for the network in connected mode. If the network has changed, the flow chart braches to step S27 in which measurements logging for the old network is ceased, transmission of logged measurements for the old network is inhibited, measurements may be logged for the connected new network, and transmission of logged measurements for the new network is allowed.

According to an embodiment of the invention, the UE 10 does not report logged MDT measurements or a log file (collected in idle or connected mode) to a network when a broadcasted public land mobile network identification (PLMN-ID) is different from the one in use when the specific measurements have been configured. When the UE 10 changes the PLMN while logging radio measurements, the relevant MDT configuration is cleared and the MDT measurements logged for the previous PLMN is prevented from being transmitted, from the moment the UE 10 has been configured for the other PLMN. A selected PLMN entry may be identified in a plmn identity list in SystemInformationBlockType1 read from broadcast information when multiple PLMN identities are broadcast and may be confirmed by the UE 10 during connection establishment. Logged MDT radio measurements may also be recorded with the identity of the PLMN for which they have been taken. Based on such records the UE 10, e.g. the processor 11, may compare to the identity of the selected PLMN after connection is established with the identity of the PLMN for which radio measurements have been captured.

According to an embodiment of the invention, an area may comprise at least one of: cells, lists of cells, tracking areas, routing areas and location areas. Each area has its own identification and part of the identification may be the PLMN-ID. Assuming a case in which measurements logging is configured in location areas LA1 and LA2, both belonging to a PLMN with an ID=1, the UE 10 performs logging in these LAs, but after a while it moves to a location area LA3. If LA3 still belongs to the PLMN with the ID=1, then the logged measurements are allowed to be reported in LA3. However, if LA3 belongs to a PLMN with another ID, then reporting is not allowed.

According to an embodiment of the invention, in case the identities of the selected PLMN and the PLMN for which the radio measurements have been logged are different, any predefined MDT configuration is ceased and the collected data is removed.

According to another embodiment of the invention, depending on capabilities of the UE 10 (e.g. memory size, battery capacity) and network situation, the UE 10 keeps the logged measurements for some (limited) period of time until the next connection to the PLMN for which the logged measurements have been collected, even though there were some PLMN changes in between, and disallows transmission of the logged measurements only when an MDT report request is received from a PLMN with a different identity than that of the PLMN which configured the logging. In case the UE 10 returns to the PLMN which configured the logging, it allows transmission of the logged measurements.

Anyhow, regardless of the selected restriction, the merit of the solution is that UE measurement logs defined for the scheduled area are not routed to any other network.

Figure 3:
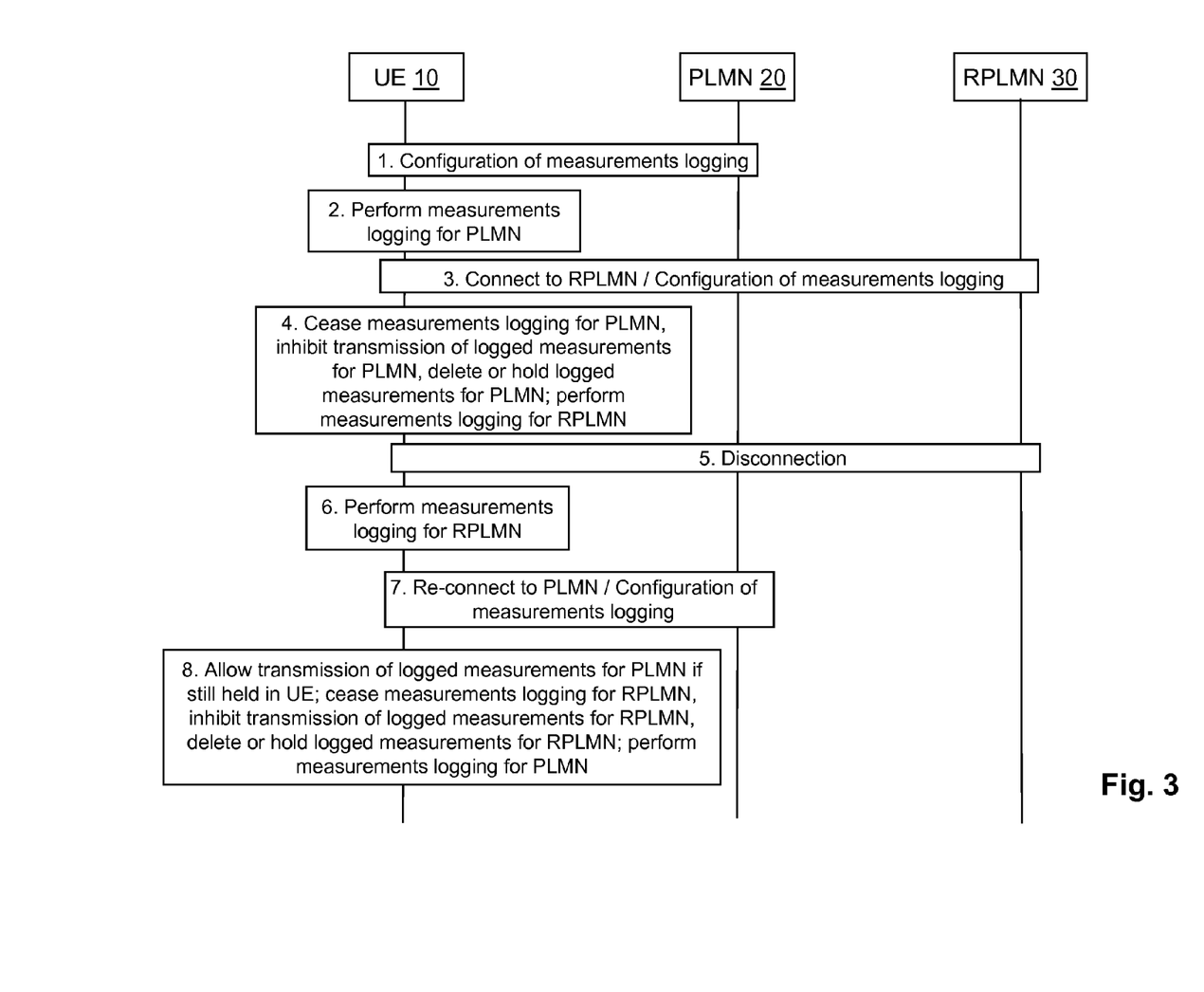
FIG. 3 shows a signaling diagram illustrating operation of a user equipment which logs measurements and connects to different networks, according to an embodiment of the invention.

FIG. 3 shows a signalling diagram illustration operation of the UE 10 which connects to an RPLMN 30 when collecting radio measurements for a PLMN 20, according to an embodiment of the invention.

In a step 1, the UE 10 is configured by the PLMN 20 to perform measurements logging for the PLMN 20, which the UE 10 carries out in step 2. Step 2 may be performed in idle mode of the UE 10 or in connected mode in which the UE 10 is connected with the PLMN 20.

In step 3 the UE 10 connects to the RPLMN 30. In this context, the UE 10 may be configured by the RPLMN 30 to perform measurements logging for the RPLMN 30.

Upon connecting with the RPLMN 30, in step 4 the UE 10 ceases measurements logging for the PLMN 20 and inhibits transmission of logged measurements for the PLMN 20. The UE 10 may delete or hold logged measurements for the PLMN 20 as described above. In case the UE 10 is configured to perform measurements logging for the RPLMN 30 in step 3, it may perform measurements logging for the RPLMN 30 in the connected mode and, after an optional disconnection in step 5, in idle mode in step 6.

In step 7 the UE 10 re-connects to the PLMN 20. In this context, the UE 10 may be configured by the PLMN 20 to perform measurements logging for the PLMN 20.

Upon connecting with the PLMN 20, in step 8 the UE 10 allows transmission of logged measurements for the PLMN 20 which have been collected in step 2 if still held in the UE 10. The UE 10 ceases measurements logging for the RPLMN 30, inhibits transmission of logged measurements for the RPLMN 30, and deletes or holds logged measurements for the RPLMN 30 as described above. In case the UE 10 is configured to perform measurements logging for the PLMN 30 in step 7, the UE 10 may perform measurements logging for the PLMN 20 in connected mode and, after an optional disconnection, in idle mode.

Thus, whether in idle or connected mode, the UE 10 performs control such that logged measurements are not transmitted to another network of a mobile communications network different from the network of the area which configured the measurements logging. Also in a case when the UE 10 performs real-time reporting of logged measurements in connected mode and an RLF occurs, logged measurements can be effectively prevented from being routed to a network different from the network of the area with which the UE 10 was connected when the RLF occurred.

According to an aspect of the invention, an apparatus, such as the UE 10 shown in FIG. 1, comprises logging means for performing measurements logging which has been defined for a scheduled area belonging to a network of a mobile communications network, the measurements comprising information about performance of the scheduled area, connecting means for connecting the apparatus to an area of areas of the mobile communications network, detecting means for detecting to which area of the areas of the mobile communications network the connecting means connect the apparatus, and preventing means for preventing transmission of the logged measurements in case the area to which the connecting means connect the apparatus belongs to a network of the mobile communications network which is different from the network of the scheduled area. The logging means, detecting means and preventing means may comprise the processor 11, and the connecting means may comprise the transceiver 13.

The apparatus may further comprise deleting means for deleting the logged measurements for the scheduled area in case the area to which the connecting means connect the apparatus belongs to a network of the mobile communications network which is different from the network of the scheduled area. The deleting means may comprise the processor 11.

The apparatus may further comprise holding means for, in case the area to which the connecting means connect the apparatus belongs to a network of the mobile communications network which is different from the network of the scheduled area, holding the logged measurements for a predetermined period of time and/or until reconnecting means of the apparatus reconnect the apparatus to the network of the scheduled area, based on a condition, wherein the apparatus may comprise allowing means for allowing transmission of the logged measurements for the scheduled area in case the reconnecting means reconnect the apparatus to the network of the scheduled area. The holding means and allowing means may comprise the processor 11, and the reconnecting means may comprise the transceiver 13.

The networks may each comprise an identity, and the apparatus may comprise recording means for recording the logged measurements for the scheduled area with the identity of the network of the scheduled area, and the preventing means may prevent transmission of the logged measurements and the deleting means may delete the logged measurements or the holding means may hold the logged measurements in case the identity of the network of the area to which the connecting means connect the apparatus is different from the identity of the network recorded for the logged measurements. The recording means may comprise the processor 11.

The areas of the mobile communications network may comprise at least one of the following: cells, lists of cells, tracking areas, routing areas and location areas, the network of the scheduled area and the network of the area to which the connecting means connect the apparatus may be public land mobile networks, the measurements may comprise minimization drive test measurements, and the measurements may be collected in idle and/or connected mode of the apparatus.

The measurements logging defined for the scheduled area may comprise measurements logging defined for the network of the scheduled area.

The areas may each comprise an identity, and the recording means may record the logged measurements for the scheduled area with the identity of the scheduled area.

According to an embodiment of the invention, a user equipment performs measurements logging which has been defined for a scheduled area belonging to a network of a mobile communications network, the measurements comprising information about performance of the scheduled area. In case the user equipment connects to an area of areas of the mobile communications network which belongs to a network different from the network of the scheduled area, the user equipment prevents transmission of the logged measurements.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising:
at least one processor;
memory storing a program of instructions;
wherein the memory storing the program of instructions is configured to, with the at least one processor, cause the apparatus to at least:
perform measurements logging for a list of network identities defining an area of interest for minimization of drive test measurements in a mobile communications network, the measurements comprising information about performance of the defined area of interest;
establish a connection of the apparatus to an area of the mobile communications network;
detect to which area of the mobile communications network the apparatus is connected;
compare network identities defining the area of interest against the network identity of the area to which the apparatus is connected, to determine if the area to which the apparatus is connected by the mobile communications network belongs to the defined area of interest of the mobile communications network;
determine, in case the area to which the apparatus is connected is different from the defined area of interest, whether the network to which the apparatus is connected has changed;
prevent beginning of transmission of existing logged measurements in case the area to which the apparatus is connected belongs to an area of the mobile communications network which is different from the defined area of interest of the mobile communications network and the network to which the apparatus has connected has changed;
in case the area to which the apparatus is connected is different from the defined area of interest, hold the logged measurements for a predetermined period of time; and
in case the area to which a transceiver connects the apparatus belongs to an area of the mobile communications network which is different from the defined area of interest of the mobile communications network, allow, after expiration of the predetermined period of time, transmission of the logged measurements for the area of interest in case the transceiver reconnects the apparatus to the network of the defined area of interest.

2. The apparatus of claim 1, wherein the apparatus is further caused to delete the logged measurements for the area of interest of the mobile communications network in case the area to which the apparatus is connected belongs to an area of the mobile communications network which is different from the network of the defined area of interest of the mobile communications network.

3. The apparatus of claim 1, wherein the networks each comprise an identity, and the apparatus is caused to record the logged measurements for the area of interest of the mobile communications network with the identity of the defined area of interest, and wherein the processor is configured to prevent transmission of the logged measurements and/or delete the logged measurements and/or hold the logged measurements in case the identity of the area to which the transceiver connects the apparatus is different from the identity of the area recorded for the logged measurements.

4. The apparatus of claim 1, wherein the areas of the mobile communications network comprise at least one of the following: cells, lists of cells, tracking areas, routing areas and location areas, and/or wherein the network of the defined area of interest of the mobile communications network and the network of the area to which the transceiver connects the apparatus are public land mobile networks, and/or wherein the measurements comprise minimization drive test measurements, and/or wherein the measurements are collected in idle and/or connected mode of the apparatus.

5. The apparatus of claim 1, wherein the measurements logging defined for the scheduled area comprises measurements logging defined for the network of the defined area of interest of the mobile communications network.

6. The apparatus of claim 1, wherein the areas each comprise an identity, and the processor is configured to record the logged measurements for the scheduled area with the identity of the defined area of interest of the mobile communications network.

7. A method comprising:
  performing measurements logging for a list of network identities each defining an area of interest for minimization of drive test measurements in a mobile communications network, the measurements comprising information about performance of the area of interest;
  establishing a connection of a mobile terminal to an area of the mobile communications network;
  detecting to which area of the mobile communications network the mobile terminal is connected;
  comparing network identities defining the area of interest against the network identity of the area to which the apparatus is connected, to determine if the area to which the apparatus is connected belongs to the defined area of interest of the mobile communications network;
  determining, in case the area to which the apparatus is connected is different from the defined area of interest, whether the network to which the apparatus is connected has chanced:
  preventing beginning of transmission of the existing logged measurements in case the area to which the mobile terminal is connected belongs to an area of the mobile communications network which is different from the defined area of interest of the mobile communications network and the network to which the apparatus has connected has changed;
  in case the area to which the mobile terminal is connected is different from the defined area of interest, holding the logged measurements for a predetermined period of time; and
  in case the area to which a transceiver connects the apparatus belongs to an area of the mobile communications network which is different from the area of interest of the mobile communications network, allow, after expiration of the predetermined period of time, transmission of the logged measurements for the area of interest in case the mobile terminal is reconnected to the network of the defined area of interest.

8. The method of claim 7, comprising:
  deleting the logged measurements for the scheduled area in case the area to which the connection is performed belongs to a an area of the mobile communications network which is different from the network of the defined area of interest.

9. The method of claim 7, comprising:
  in case the area to which the mobile terminal is connected belongs to an area of the mobile communications network which is different from the defined area of interest, holding the logged measurements for the predetermined period of time; and
  after expiration of the predetermined period of time, allowing transmission of the logged measurements for the defined area of interest in case of reconnection to the network of the defined area of interest.

10. The method of claim 7, wherein the networks each comprise an identity, and the method comprises:
  recording the logged measurements for the scheduled area with the identity of the network of the defined area of interest, and preventing transmission of the logged measurements and deleting the logged measurements or holding the logged measurements in case the identity of the area to which the connection is performed is different from the identity of the area recorded for the logged measurements.

11. The method of claim 7, wherein the areas of the mobile communications network comprise at least one of the following: cells, lists of cells, tracking areas, routing areas and location areas, and/or wherein the network of the scheduled area and the network of the area to which the connection is performed apparatus are public land mobile networks, and/or wherein the measurements comprise minimization drive test measurements, and/or wherein the measurements are collected in idle and/or connected mode.

12. The method of claim 7, wherein the measurements logging defined for the defined area of interest comprises measurements logging defined for the network of the area of interest.

13. The method of claim 7, wherein the areas each comprise an identity, and the method comprises:
  recording the logged measurements for the defined area of interest a with the identity of the defined area of interest.

14. A non-transitory computer readable medium storing a program of instructions, execution of which by a processor configures an apparatus to at least:
  perform measurements logging for a list of network identities defining an area of interest for minimization of drive test measurements in a mobile communications network, the measurements comprising information about performance of the area of interest;
  establish a connection of the apparatus to an area of the mobile communications network;
  detect to which area of the areas of the mobile communications network the apparatus is connected;
  compare network identities defining the area of interest against the network identity of the area to which the apparatus is connected, to determine if the area to which the apparatus is connected belongs to the defined area of interest of the mobile communications network;

determine, in case the area to which the apparatus is connected is different from the defined area of interest, whether the network to which the apparatus is connected has changed;

prevent beginning of transmission of the existing logged measurements in case the area to which the apparatus is connected belongs to an area of the mobile communications network which is different from the defined area of interest of the mobile communications network and the network to which the apparatus has connected has changed;

in case the area to which the apparatus is connected is different from the defined area of interest of the mobile communications network, hold the logged measurements for a predetermined period of time; and in case the area to which a transceiver connects the apparatus belongs to an area of the mobile communications network which is different from the defined area of interest of the mobile communications network, allow, after expiration of the predetermined period of time, to allow transmission of the logged measurements for the area of interest in case the apparatus is reconnected to the network of the defined area of interest.

15. The non-transitory computer readable medium according to claim 14, wherein the non-transitory computer readable medium comprises a module adapted for insertion into a data processing device.

16. The non-transitory computer readable medium according to claim 14, wherein the program is directly loadable into an internal memory of the processor.

17. The apparatus of claim 1, wherein the logged measurements are retained for the area of interest in case the area to which apparatus is connected belongs to an area of the mobile communications network different from the network of the defined area of interest.

18. The apparatus of claim 1, wherein the apparatus is further caused to notify the network in case the area to which the apparatus is connected belongs to the defined area of interest, and reporting existing logged measurement results.

* * * * *

UNITED STATES PATENT AND TRADEMARK OFFICE
CERTIFICATE OF CORRECTION

PATENT NO. : 9,591,503 B2
APPLICATION NO. : 13/702597
DATED : March 7, 2017
INVENTOR(S) : Tomala et al.

It is certified that error appears in the above-identified patent and that said Letters Patent is hereby corrected as shown below:

In the Claims

Claim 7, Column 9, Line 53 "chanced" should be deleted and --changed-- should be inserted.

Signed and Sealed this
Twenty-third Day of May, 2017

Michelle K. Lee
*Director of the United States Patent and Trademark Office*